US005832776A

United States Patent [19]

Kuo

[11] Patent Number: 5,832,776

[45] Date of Patent: Nov. 10, 1998

[54] LEADSCREW ASSEMBLY WITH A NO-GROOVED SHAFT

[76] Inventor: Chang-Hsin Kuo, No. 46, 37th Rd., Taichung Industrial Park, Taichung, Taiwan

[21] Appl. No.: 717,824

[22] Filed: Sep. 23, 1996

[51] Int. Cl.$^{6}$ ..................................................... F16H 25/22

[52] U.S. Cl. .................................................. 74/89; 74/459

[58] Field of Search .......................................... 74/89, 459

[56] References Cited

U.S. PATENT DOCUMENTS

| | | | |
|---|---|---|---|
| 2,350,538 | 6/1944 | Selnes | 74/459 |
| 4,722,236 | 2/1988 | Wood | 74/89 |
| 4,726,242 | 2/1988 | Baghdasarian | 74/89 |
| 4,841,796 | 6/1989 | Teramachi | 74/459 |
| 5,154,091 | 10/1992 | Bianco | 74/459 |
| 5,228,353 | 7/1993 | Katahira et al. | 74/459 X |

FOREIGN PATENT DOCUMENTS

| | | | |
|---|---|---|---|
| 2-51650 | 2/1990 | Japan | 74/89 |

*Primary Examiner*—Charles A. Marmor
*Assistant Examiner*—Troy Grabow
*Attorney, Agent, or Firm*—David & Raymond; Raymond Y. Chan

[57] ABSTRACT

A leadscrew assembly includes a cylindrical no-grooved shaft and a nut body similar to a conventional ballscrew and nut assembly of internal recirculating steel balls. This newly developed device according to the invention has outstanding features such as compact in size, accurate guiding distance, and small frictional resistance suitable for the application field of device where a high accuracy, smooth operation, low side thrust and compactness in size are required.

1 Claim, 3 Drawing Sheets

36 32 34 31 A 321 1 32 B 39 37 3 35 33

LEADSCREW ASSEMBLY WITH A NO-GROOVED SHAFT

FIELD OF THE PRESENT INVENTION

The present invention relates to a leadscrew assembly which comprises a no-grooved shaft and a screw nut similar to a conventional ballscrew with internal recirculating steel balls. The present invention provides excellent linearity in motion and positioning accuracy.

BACKGROUND OF THE PRESENT INVENTION

Conventional ACME screws and ball screws are commonly utilized in a linear motion transmission mechanism for converting a motor's rotating motion into a linear motion. Both the ACME screws and ball screws are capable of withstanding a great side thrust force. In 1952, another kind of transmission mechanism was provided for withstanding smaller side thrust force, which comprises a no-grooved shaft and several bearing units. Each of the bearing units is kept in a certain inclination with respect to the shaft. FIG. 1 is a schematic view illustrating the motion of this mechanism, in which a relative linear motion is produced between the shaft and bearings by means of the relative rotation between the shaft and bearings. Shaft 1 is penetrated through three bearings 21, 22, 23 and keeps in contact with those bearings 21, 22, 23 only at one point respectively. The contact points are shown in FIG. 1 as 24, 25, 26. Generally, the contact points are uniformly distributed around the outer surface of the shaft and exert a radial force against the shaft. The plane of the transverse section of the shaft has a fixed angle θ with respect to the shaft at the contact point. As the shaft makes one revolution, it displaces linearly along its longitudinal direction for a distance of $2\pi R \tan \theta 0$ with respect to the bearing, wherein π is the Ludolphian number 3.1416 and R is the radius of the shaft. Due to the fact that the shaft 1 can smoothly rotate with respect to the bearings 21, 22, 23 in high speed, the mechanism provides an outstanding feature of enabling very smooth and rapid rotation with low noise. On the other hand, the relatively big sizes of the shaft and bearing unit occupy too much space, that is inconvenient for wide application. Besides, the distance of displacement of the shaft is restricted by the inclination angle θ between the shaft and the bearings, so that it is difficult to adjust and is not applicable to the device which needs a high-accuracy positioning characteristic.

SUMMARY OF THE PRESENT INVENTION

The present invention relates to a leadscrew assembly which comprises a no-grooved shaft and a nut body similar to a conventional ballscrew and nut assembly with internal recirculating steel balls. The inner surface of the nut body is provided with a Gothic form profiled threaded groove. Each steel ball has two points in contact with the Gothic form profiled threaded groove, and that each steel ball has only one point in contact with the shaft. Due to the fact the friction force of the ball in sliding contact is far greater than that in rolling contact, the steel ball can revolve along the path of the threaded groove without side sliding. Therefore, the leadscrew assembly according to the invention provides features of excellent linearity in motion and high accuracy in positioning, and that the deficiency of being too large in size and difficulty in positioning of the conventional art are eliminated.

DETAILED DESCRIPTION OF THE PREFERRED EMBODIMENT

Figure 2:
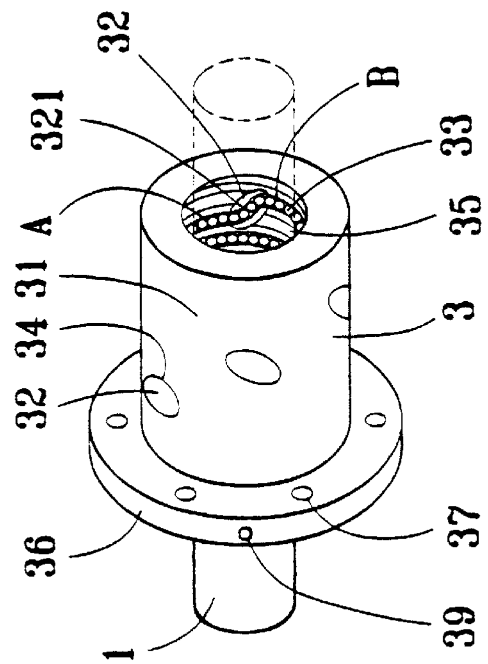
FIG. 2 is a perspective view of a leadscrew assembly according to a first preferred embodiment of the present invention, wherein the shaft is illustrated in dotted line to show the interior threaded grooves of the nut assembly.
Figure 1:
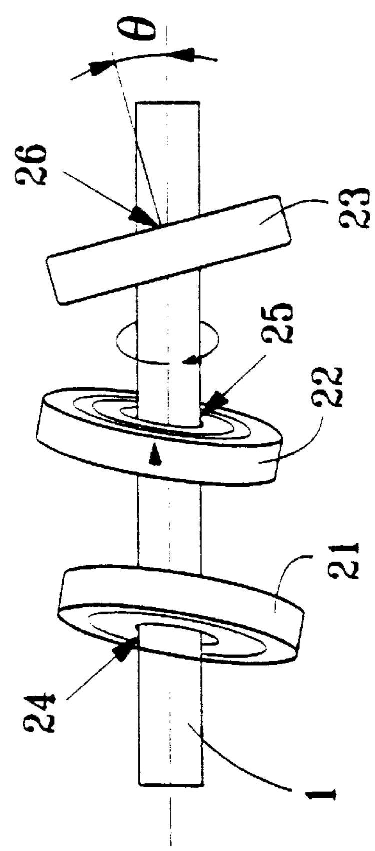
FIG. 1 is a perspective view of a conventional mechanism of leadscrew assembly with a no-grooved shaft.
Figure 4:
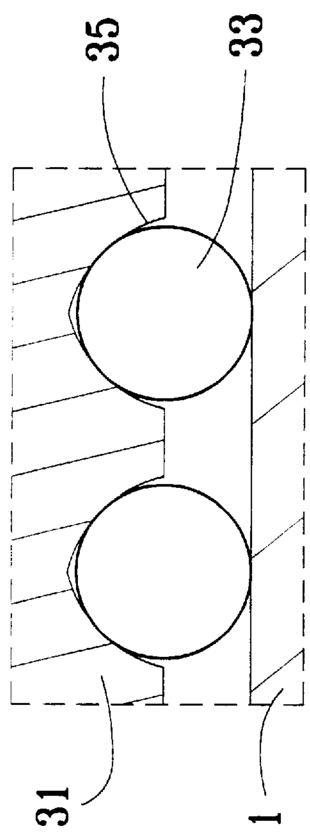
FIG. 4 is a partial enlarged view of FIG.3.
Figure 3:
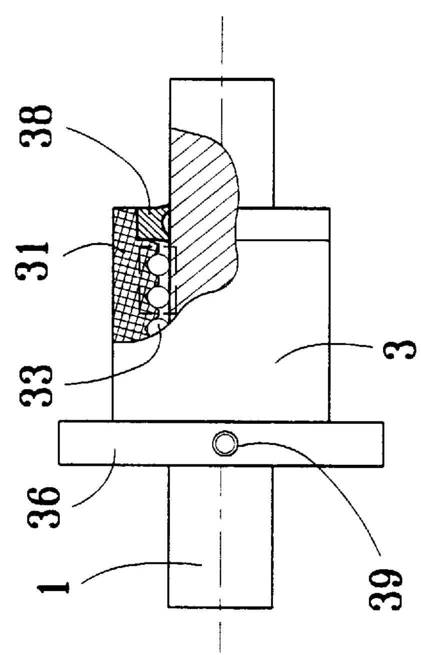
FIG. 3 is a partial sectional side view of the leadscrew assembly according to the above first preferred embodiment of the present invention.

Referring to FIG. 2, a leadscrew assembly according to a first preferred embodiment of the present invention is illustrated. The leadscrew assembly comprises a nut assembly 3 and a main shaft 1 which has no threaded groove provided at the motion transmitting region between the main shaft 1 and nut assembly 3. The nut assembly 3 comprises a nut body 31, a plurality of return caps 32 and a plurality of recirculating steel balls 33. On the inner surface of the nut body 31, there are Gothic form profiled threaded grooves 35, each having a cross section formed by two intersecting arcs, as shown in FIG. 4. A plurality of long holes 34 are provided on the nut body 31 and the plurality of return caps 32 are respectively squeezed into the long holes 34. The nut body 31 further comprises a flange 36, which has flange holes 37 and an oil hole provided thereon. The nut assembly 3 further comprises an oil seal 38 engaged at each end thereof, as shown in FIG. 3, for preventing ingression of foreign objects and avoiding loss of lubricating grease. FIG. 4 shows the enlarged view for part of FIG. 3, in which it is observed that the steel ball 33 is in contact with the Gothic form profiled threaded groove 35 at two points and in contact with the main shaft 1 at one point only. The sliding friction of each ball 33 is far greater than the rolling friction between the main shaft 1 and the steel ball 33. Therefore, if the side thrust force exerted to the steel ball 33 is smaller than static sliding frictional resistance between the steel ball 33 and the shaft 1, the side sliding motion between the steel balls 33 and the shaft 1 can be avoided and steel balls 33 will be capable of revolving along the path of the threaded grooves 35. The leadscrew assembly provides features of excellent linearity in motion and maintaining accurate displacement and position of the shaft 1.

In order to maintain the smooth circulation of a predetermined number of the steel balls 33 in the nut assembly 3, the long holes 34 are provided on the nut body 31 for connecting every two neighboring threaded grooves such as A and B as shown in FIG. 2. The return caps 32, which are squeezed into the long holes 34 respectively, each has a S-shaped sliding slot 321 provided thereon. The S-shaped sliding slot 321 has a width slightly larger than the diameter of the steel ball and a depth slightly deeper than that of the Gothic form threaded groove, so that the steel balls 33 receive no contact frictional resistance from the main shaft 1 when passing through the slot 321. Therefore, the steel balls 33 can easily pass over from one threaded groove A to another neighboring threaded groove B via the S-shaped sliding slot 321 to maintain a smooth circulation in the leadscrew assembly of the present invention.

Figure 5:
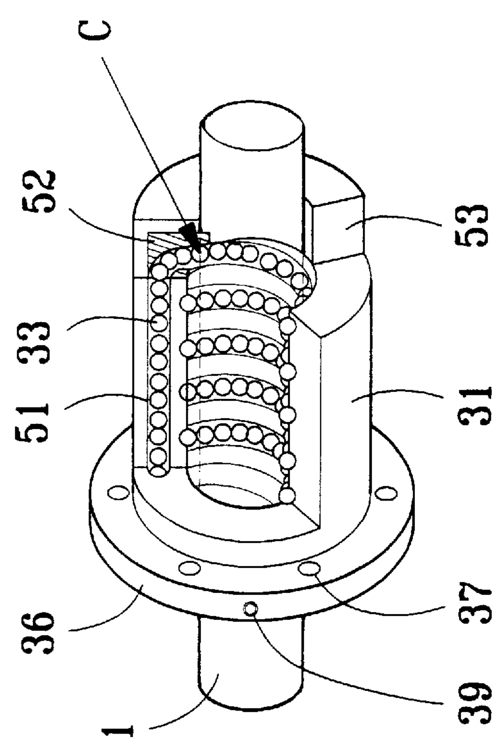
FIG. 5 is a perspective view of a leadscrew assembly according to a second preferred embodiment of the present invention, wherein portion of the main shaft is illustrated in dotted-line to show the interior threaded grooves of the nut assembly.

FIG. 5 is a perspective view illustrating a second preferred embodiment of the leadscrew assembly according to the invention. In this second embodiment, the return caps 32 and long holes 34 as shown in FIG. 2 for conducting the steel ball recirculation are deleted. A penetrating hole 51 which is parallel with the center axis of the main shaft 1 and has a diameter slightly larger than that of the steel ball 33 is provided in the nut body 31. A guide damper 52 is connected to a terminal C of an outermost Gothic form profiled threaded groove 35 for guiding the steel balls 33 to feed into the penetrating hole 51 from the outermost Gothic form profiled threaded groove 35. Then, afterwards, the steel balls 33 are transferred to another guide damper 52 located at the opposite terminal of the nut body 31 and are guided into another outermost threaded groove 35 at the other end of the nut body 31. Thus, one circulation of the steel balls is completed and the moving of the balls is repeated continuously in this manner.

What is claimed is:

1. A leadscrew assembly comprising a nut assembly and a main shaft which has no threaded groove provided at a motion transmitting region between said shaft and said nut assembly, said nut assembly comprising a nut body, a plurality of return caps and a plurality of recirculating steel balls, wherein Gothic form profiled threaded grooves are provided on an inner surface of said nut body, each of said Gothic form profiled threaded grooves having a cross section formed by two intersecting arcs, said nut body having a plurality of long holes being provided thereon and further comprising a flange which has flange holes and an oil hole provided thereon, in which said plurality of return caps are respectively squeezed into said long holes of said nut body, said nut assembly further comprising an oil seal engaged at each end thereof, wherein each of said steel balls is in contact with said Gothic form profiled threaded groove at two points and in contact with said main shaft at one point, so that if a side thrust force exerted to each of said steel balls is smaller than a static sliding frictional resistance between each of said steel balls and said main shaft, a side sliding motion between each of said steel balls and said main shaft is avoided and said steel balls are capable of revolving along a path of said Gothic form profiled threaded grooves, said long holes provided on said nut body each respectively connecting every two of said neighboring Gothic form threaded grooves in order to maintain a smooth circulation of a predetermined number of said steel balls in said nut assembly, each of said return caps having a S-shaped sliding slot provided thereon, each of said S-shaped sliding slots has a width slightly larger than a diameter of each of said steel balls and a depth slightly deeper than each of said Gothic form threaded grooves, so that said steel balls receive no contact frictional resistance from said main shaft when passing through said slot, therefore said steel balls are able to easily pass over from one of said Gothic form threaded grooves to another said neighboring Gothic form thread groove via said S-shaped sliding slot to maintain a smooth circulation in said leadscrew assembly.

* * * * *